United States Patent
Wang

(10) Patent No.: US 10,353,998 B2
(45) Date of Patent: Jul. 16, 2019

(54) INFORMATION PROCESSING APPARATUS WITH REAL TIME UPDATE RELATED TO DATA EDITED WHILE FORM DOCUMENT DATA IS BROWSED, CONTROL METHOD, AND STORAGE MEDIUM

(71) Applicant: CANON KABUSHIKI KAISHA, Tokyo (JP)

(72) Inventor: Zhicheng Wang, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/822,027

(22) Filed: Aug. 10, 2015

(65) Prior Publication Data
US 2016/0062976 A1 Mar. 3, 2016

(30) Foreign Application Priority Data
Aug. 27, 2014 (JP) ................................. 2014-172724

(51) Int. Cl.
*G06F 17/00* (2019.01)
*G06F 17/24* (2006.01)

(52) U.S. Cl.
CPC .................................. *G06F 17/243* (2013.01)

(58) Field of Classification Search
None
See application file for complete search history.

(56) References Cited

U.S. PATENT DOCUMENTS

| 7,673,228 B2 | 3/2010 | Kelkar et al. ................. 715/223 |
| 2006/0167905 A1* | 7/2006 | Liu ..................... G06F 17/2247 |
| 2006/0230338 A1* | 10/2006 | Kelkar ..................... H04L 67/02 715/205 |
| 2007/0150163 A1* | 6/2007 | Austin .............. G06F 17/30616 701/102 |
| 2008/0010586 A1* | 1/2008 | Betancourt ......... G06F 17/2247 715/221 |
| 2008/0141121 A1 | 6/2008 | Koyano ........................ 715/255 |
| 2009/0067004 A1* | 3/2009 | Mazur ................... G06F 3/1213 358/1.17 |

(Continued)

FOREIGN PATENT DOCUMENTS

| JP | 2005-190432 A | 7/2005 |
| JP | 2006-285980 | 10/2006 |

(Continued)

OTHER PUBLICATIONS

Office Action dated Sep. 11, 2018 in counterpart Japan Application No. 2014-172724, together with English translation thereof.

*Primary Examiner* — Mustafa A Amin
(74) *Attorney, Agent, or Firm* — Venable LLP

(57) ABSTRACT

PDL information is generated by executing rendering commands for overlaying form information and field data. When PDL information are generated by executed the rendering commands, calculation information is automatically generated which indicates a calculation relation between a plurality of fields. A form page in PDF format is generated, the form page is converted to SVG format, data for displaying a browsing screen on which browsing and editing of the form page are performed based on the form page and the generated calculation information is generated, and the generated data for displaying the browsing screen is transmitted to a client device.

10 Claims, 14 Drawing Sheets

(56) References Cited

U.S. PATENT DOCUMENTS

| | | | |
|---|---|---|---|
| 2009/0254803 A1* | 10/2009 | Bayne | G06F 17/243 715/222 |
| 2015/0089345 A1* | 3/2015 | Marimuthu | G06F 17/243 715/221 |
| 2015/0212981 A1* | 7/2015 | Wakefield | G06F 17/212 715/274 |

FOREIGN PATENT DOCUMENTS

| | | |
|---|---|---|
| JP | 2007-188448 | 7/2007 |
| JP | 2008-146180 | 6/2008 |

\* cited by examiner

INFORMATION PROCESSING APPARATUS WITH REAL TIME UPDATE RELATED TO DATA EDITED WHILE FORM DOCUMENT DATA IS BROWSED, CONTROL METHOD, AND STORAGE MEDIUM

BACKGROUND OF THE INVENTION

Field of the Invention

The present invention relates to an information processing system, an information processing apparatus, a control method, and a storage medium.

Description of the Related Art

An increasing number of companies have been replacing information on paper media with document data in recent years for the purposes of efficient work and saving resources resulting from not using paper. For example, many business forms used in companies have undergone such replacement, and because business forms output by a backbone system in particular are output in an enormous number of pages and incur a huge amount of operation costs, business forms are being actively digitized. In addition, as a form of managing and performing various kinds of processing on work data on server computers, cloud computing systems have started to become widespread. Access to web pages of cloud server computers from browser of client computers via the Internet and browsing of business form document data digitized on the web pages by users are considered. Further, use cases in which such business form document data that users browse is edited and printed according to work flows are predicted to increase.

For editing business form document data digitized on web pages, a program for controlling an editing process is necessary. Here, editable spots of business form document data and calculation relations between pieces of business form document data (for example, a relation between unit value data and total data) differ depending on business form document data, and thus a control program dedicated to business form document data is necessary. For this reason, there are problems of high costs and low productivity to be solved.

Adobe Acrobat can convert documents in Adobe PDF, Microsoft Word, and other formats into a fillable PDF form that includes interactive form fields. In addition, Japanese Patent Laid-Open No. 2005-190432 discloses a business form output checking server with which a client browses and edits business form data on a browser.

However, when data edited in business form document data is related to other data in terms of calculation, it is necessary to update the related data after editing the foregoing data according to the relation. In the case of the fillable PDF form generated by Adobe Acrobat, a calculation relation has to be manually set. In addition, according to Japanese Patent Laid-Open No. 2005-190432, after the client completes editing on the browser, business form data in a database is updated to the edited data, then an overlay output process is performed again using the updated data, and thereby browsing edited data and updating of related data are realized. Thus, the overlay output process and a process of converting data into an image form that can be browsed on the browser need to be performed, and therefore time is taken from the completion of data editing to updating of the values of related fields.

SUMMARY OF THE INVENTION

The present invention aims to provide an information processing system in which, when data is edited while form document data that has been overlay-output is browsed, data related to the aforementioned data is also automatically updated in real time.

The information processing system according to an embodiment of the present invention has a form generation unit configured to generate a form page by overlaying form information and field data, a calculation information generation unit configured to automatically generate calculation information which indicates a calculation relation between a plurality of fields on the generated form page, and a browsing screen generation unit configured to generate data for displaying a browsing screen on which browsing and editing of the form page are performed based on the form page generated by the form generation unit and the calculation information generated by the calculation information generation unit.

According to the information processing system of the present invention, when there is data in business form document data that is related in terms of calculation, for example, related information which indicates the relation in terms of calculation is automatically output along with the overlay-output business form document data. Accordingly, when business form document data that is being browsed is edited, data related to the foregoing data is also automatically updated in real time.

Further features of the present invention will become apparent from the following description of exemplary embodiments (with reference to the attached drawings).

DESCRIPTION OF THE EMBODIMENTS

First Embodiment

First, general overlay output will be described. Overlay output is overlaying form information (template form) in which template information such as frame borders and/or images is recorded with variable text data (field data) and printing (or outputting) the overlaid data. A function called page registration or form registration of a page printer such as a laser printer is used, and information is registered in advance as form information. When printed with field data using the page printer, the form information can be overlaid with the field data and printed using a function called page information call or form information call. Such overlaying and printing are defined as overlay output. In addition, without printing the result of overlay output on paper, it is possible to convert the result of overlay output (overlay-processed print data) into an electronic file in a predetermined format and to output the result using a virtual printer driver.

Figure 4:
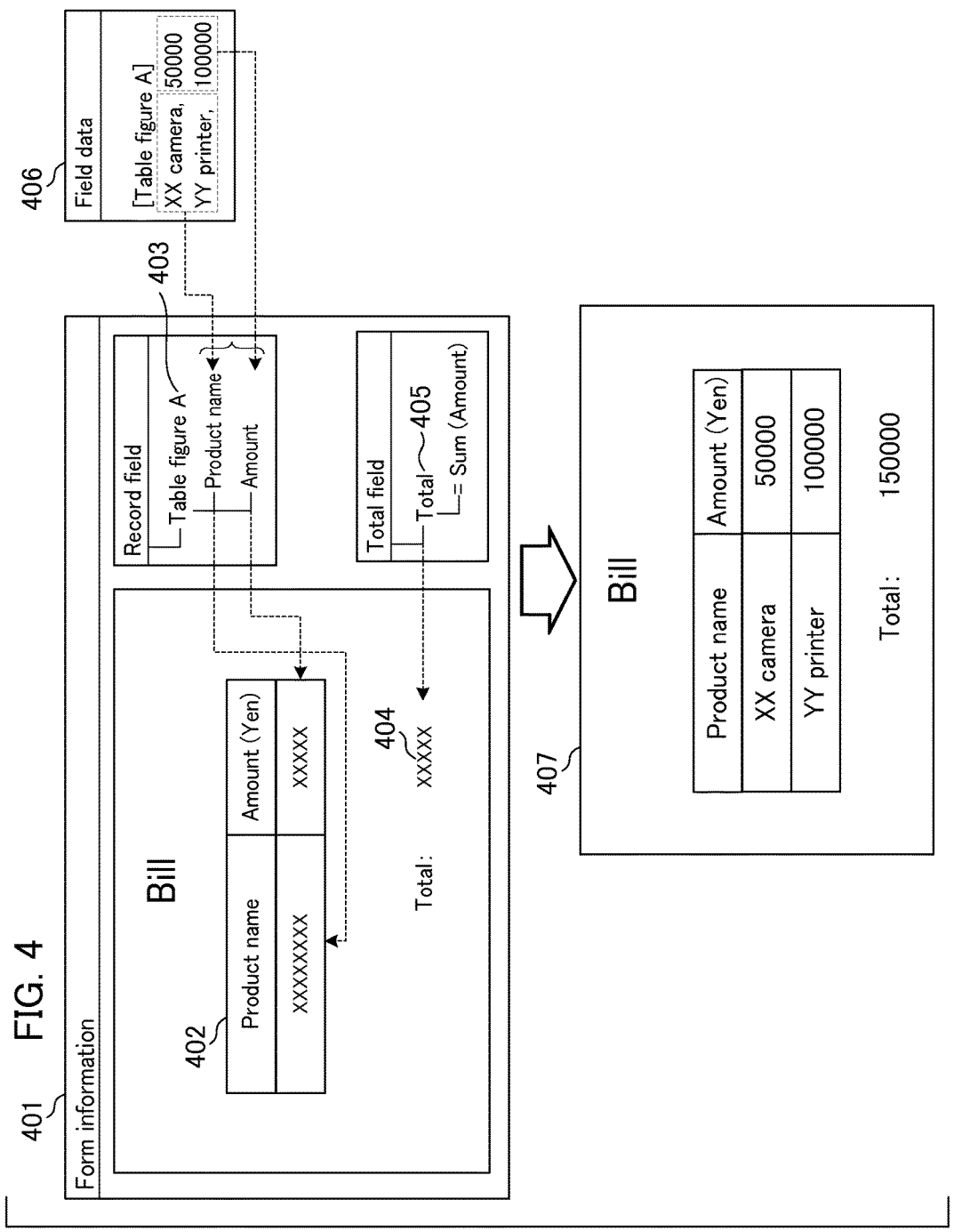
FIG. 4 is a diagram for describing an overlay output process of a business form generation server.

FIG. 4 is a diagram for describing an overview of an overlay output process performed by a business form generation server 101.

Form information can be created using a dedicated form information design system. Form information is generally constituted by a fixed figure (form figure) that is not dependent on field data and a figure that displays the accepted field data in a designed output format (field figure). In order to create the field figure, it is necessary to create items (fields) for accepting field data in advance. Fields can be created from a dedicated screen displayed in the form information design system. When the field figure is created, association with fields that are creation sources is internally made.

For a field figure in a table form (table FIG. 402, it is necessary to create a record field 403 for accepting field data in units of records. In addition, a field form in which field data is generated from an arithmetic result of data of another field figure is defined as a calculation column field. In addition, a field form in which field data is generated by totaling data using a designated totaling method is defined as a total field. For a field figure 404, a total field 405 for indicating what field and totaling method have been designated needs to be created.

The business form generation server 101 reads out a form information file 401 in which the field figures 402 and 404 and the respective fields 403 and 405 are defined, and a corresponding field data file 406. Then, the business form generation server 101 executes overlay output by overlaying the read form information file 401 with the field data file 406. Reference numeral 407 of FIG. 4 indicates the result of the overlay output.

Figure 1:
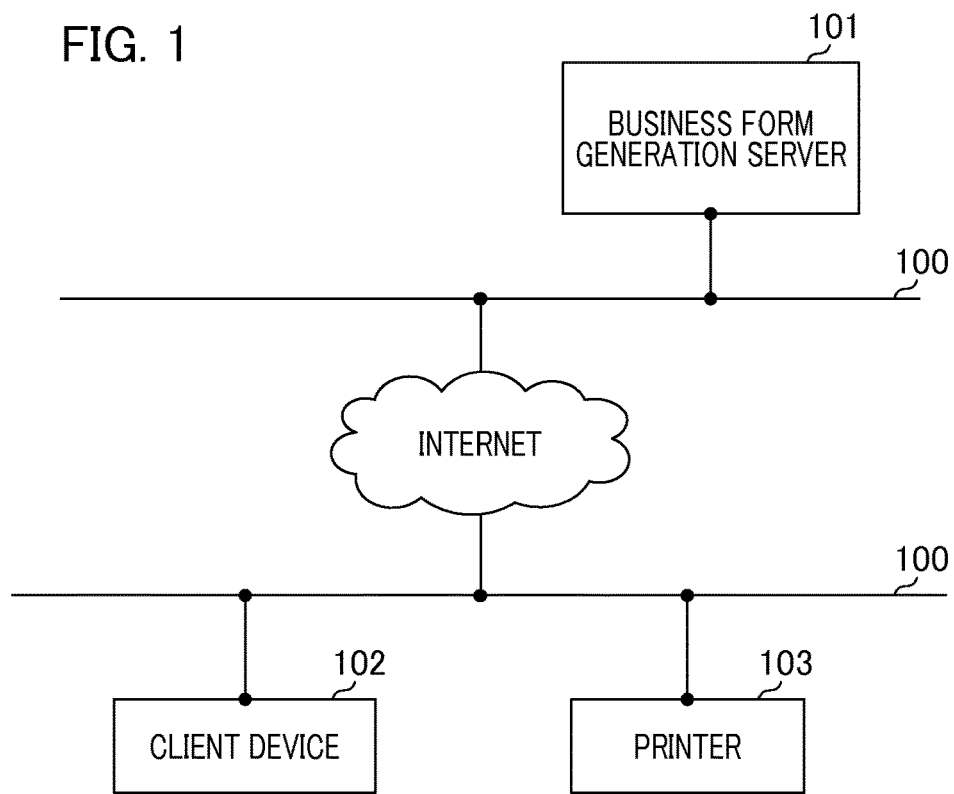
FIG. 1 is a diagram illustrating an example of a configuration of a system according to a first embodiment of the present invention.

FIG. 1 is a diagram illustrating an example of a configuration of a system of the present embodiment.

The system illustrated in FIG. 1 has the business form generation server 101 and a client device 102. The business form generation server 101 executes an overlay output process and a process of generating an electronic business form browsing program. That is to say, the business form generation server 101 generates a print page by overlaying a field data file that is text data with a form information file which includes predetermined form information. Then, the server gives an instruction to a virtual printer driver to convert the generated print page into an electronic file. In addition, a business form browsing program with which the business form can be browsed and edited using the generated electronic file (business form file) is generated.

The business form browsing program of the present embodiment is a web application which is operated on a web browser that can be distributed via a network. In many cases, such a web application is an application which is operated using a mash-up language (HTML) that expresses web pages and a programming language JAVA SCRIPT® that is operated on web browsers. Since the business form browsing program is an application displayed on web browsers, it will also be referred to hereinafter as a business form browsing screen. In addition, the business form browsing program may also be an application which is executed on a computer system rather than a web application which is operated on web browsers. Further, it may be configured such that the business form generation server 101 generates only an electronic business form file and a file which represents information of a calculation relation between fields to be described below and the client device 102 has an application which realizes browsing and editing manipulations of a business form to be described below using the files. The business form generation server 101 performs the overlay output process and business form browsing program generation process by receiving a request from the client device 102.

A printer 103 receives a request from the client device 102 and performs a process of printing business form document data on paper. In addition, the respective constituent elements are communicably connected to each other by a network 100. The network may be, for example, any of a WAN such as the Internet, a LAN, a telephone line, a dedicated digital line, an ATM and a frame relay line, a cable television line, a radio line for data broadcasting, and the like. In addition, it may be a so-called communication network that is realized with a combination thereof. That is to say, any network can be the network 100 as long as data transmission and reception are possible thereon, and a communication unit from the client device 102 to the business form generation server 101 may be different from a communication unit from the client device 102 to the printer 103.

Figure 2:
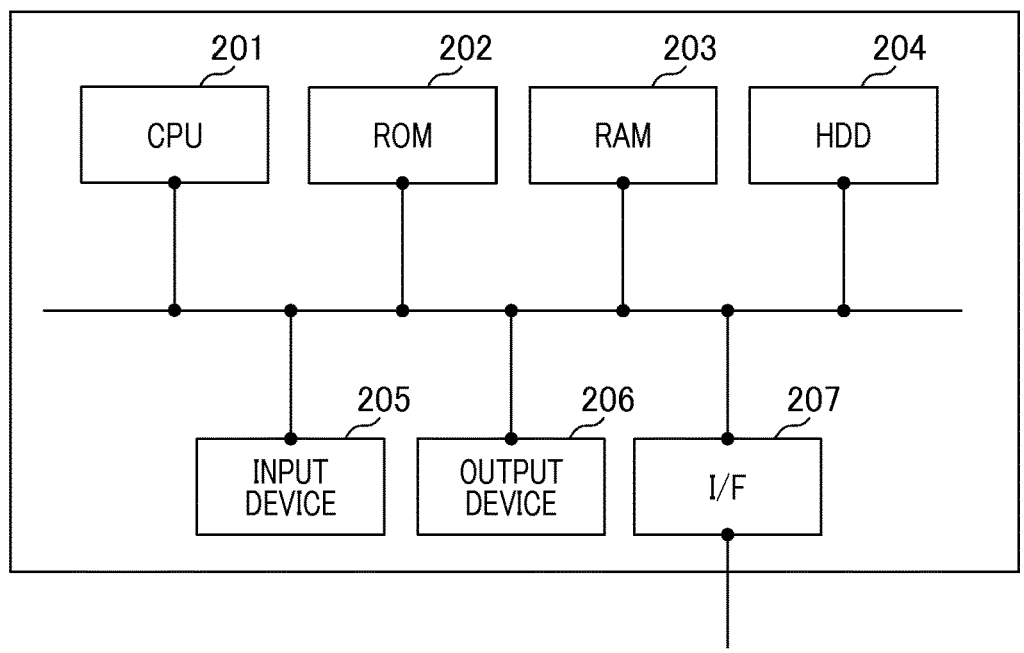
FIG. 2 is a diagram illustrating an example of a hardware configuration according to the first embodiment.

FIG. 2 is a diagram illustrating an example of a hardware configuration of the business form generation server 101 and the client device 102 of FIG. 1.

A CPU 201 directly or indirectly controls respective devices (a ROM, a RAM, and the like to be described below) which are connected to each other by an internal bus, and causes a program for realizing the present invention to be executed. The ROM 202 stores a BIOS. The RAM 203 (storage device) is used as a work area of the CPU 201 or used as a temporary storage in which a computer program (software module) for realizing the present invention is loaded.

A hard disk drive (HDD) 204 is a storage device in which an OS that is fundamental software and a software module are stored. It should be noted that a storage device such as a solid-state drive (SSD) may be used in place of the HDD. An input device 205 is a device such as a keyboard or a pointing device, none of which is illustrated, for performing input. An output device 206 is a device for performing output to which a display is connected. An I/F 207 is an interface for connecting to the network 100.

When the business form generation server 101 or the client device 102 is activated, the CPU 201 first executes the BIOS and next loads the OS from the HDD 204 onto the RAM 203 so that the OS can be executed. The CPU 201 loads various software modules to be described below from the HDD 204 onto the RAM 203 so that they can be executed according to operations of the OS when necessary. The various software modules are executed and operated by the CPU 201 in cooperation with the above-described devices. In addition, the I/F 207 is connected to the network 100, controlled by the CPU 201 according to operations of the OS, and thereby realizes communication by the above-described communication unit.

Figure 3:
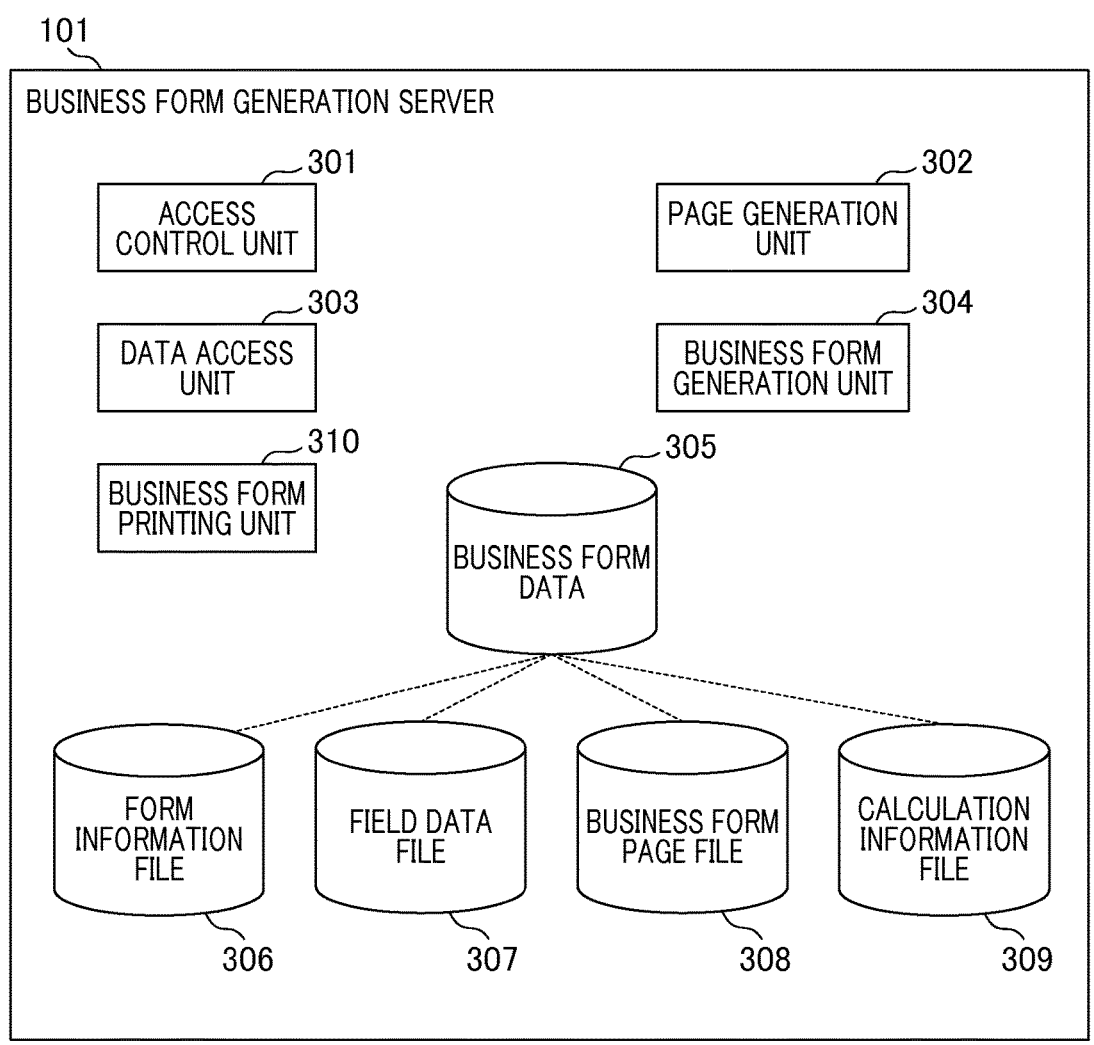
FIG. 3 is a diagram illustrating an example of a configuration of software modules that operate in a business form generation server.

FIG. 3 is a diagram illustrating an example of a configuration of software modules that operate in the business form generation server 101. It should be noted that each software module is stored in the HDD 204 illustrated in FIG. 2, and when a module is loaded in the RAM 203 and executed by the CPU 201 as described above, the CPU 201 functions as each processing unit. An access control unit 301 performs user authentication according to a request from the client device 102. A page generation unit 302 generates a web page (browsing screen generation) to send a response to the client device 102. A file of HTML, JAVA SCRIPT®, or the like necessary for a web application that is the business form browsing program is also generated by the page generation unit 302 and sent to the client device 102.

A data access unit 303 performs an access process with respect to each of databases 305, 306, 307, 308, and 309. A business form generation unit 304 generates print data by overlaying form information indicated by the form information file 401 read via the data access unit 303 with field data indicated by the field data file 406. Then, the business form generation unit 304 generates a business form page file serving as an electronic file from the generated print data using software such as a virtual printer driver. A business form printing unit 310 receives a print file generation request from the client device 102 and converts the business form page file included in the request into a printable format.

The database 305 is a database in which business form data is stored. Business form data is data indicating information such as the title and owner of a business form, and retains information which indicates a form information file and a field data file from which the business form is generated. In addition, the business form data retains information which indicates which business form pages are the result of overlay of the business form.

The database 306 is a database in which form information files are stored. The database 307 is a database in which field data files are stored. The database 308 is a database in which business form page files generated by the business form generation unit 304 are stored. The database 309 is a database in which calculation information files generated during a business form overlay output process are stored. A calculation information file will be described below. When the business form generation server receives a request from a client for browsing of a business form page, the page generation unit 302 generates a business form browsing page using a business form page file and a calculation information file and transmits the business form browsing page to the client as will be described below.

Figure 5:
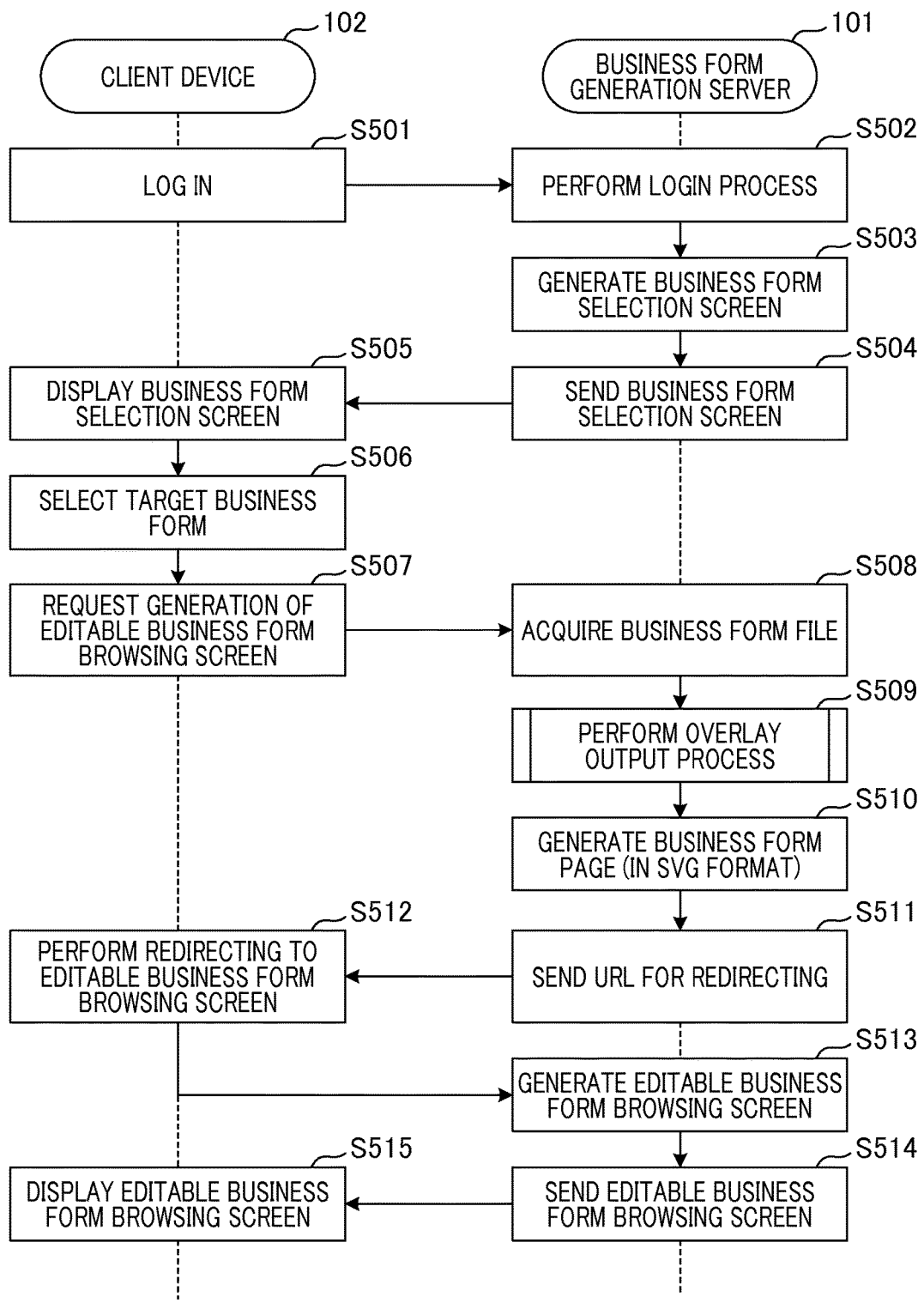
FIG. 5 is a diagram illustrating the sequence of a process of generating an editable business form browsing screen.
Figure 6:
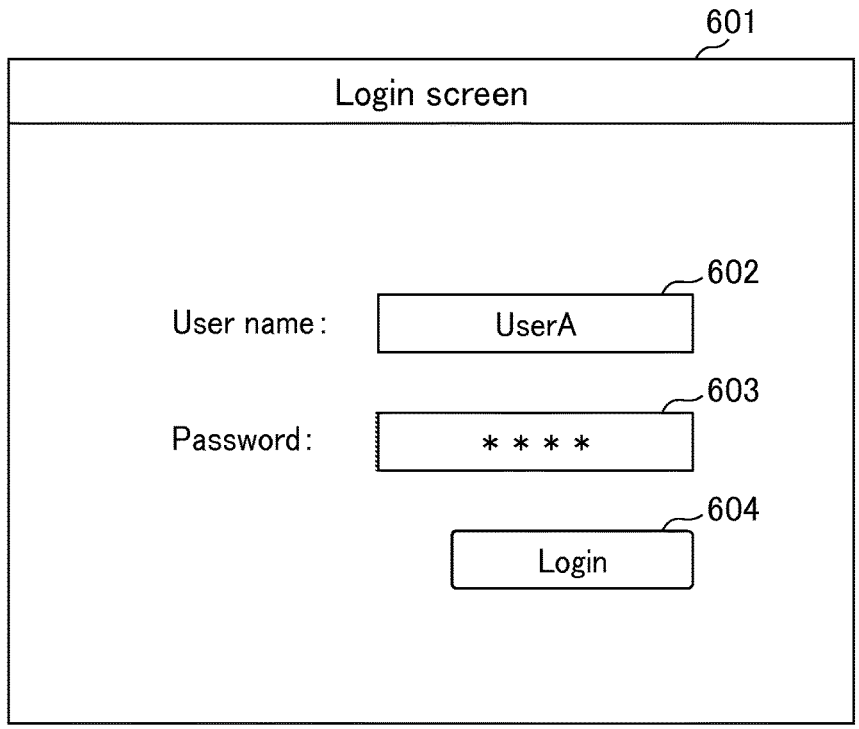
FIG. 6 is a diagram illustrating an example of a login screen.

Next, a detailed operation of the present embodiment will be described. FIG. 5 is a diagram illustrating the sequence of a process of generating an editable business form browsing screen in the present embodiment. In addition, FIG. 6 is a login screen displayed on a web browser of the client device.

First, in S501, a user transmits a request for login to the business form generation server 101 on the login screen 601 displayed on the web browser of the client device 102. The user inputs user name and password into a user name input text box 602 and a password input text box 603 of the login screen 601, presses a login button 604, and then transmits a request for login to the business form generation server 101.

In S502, the access control unit 301 of the business form generation server 101 performs a login process according to the content of the login request received from the client device 102. The access control unit 301 performs basic authentication, and when the user name and password are determined to be valid, performs S503. Since the basic authentication is a general authentication process, description thereof will be omitted. In S503, the page generation unit 302 of the business form generation server 101 generates a business form selection screen 701 illustrated in FIG. 7 according to the information of the logged in user.

Figure 7:
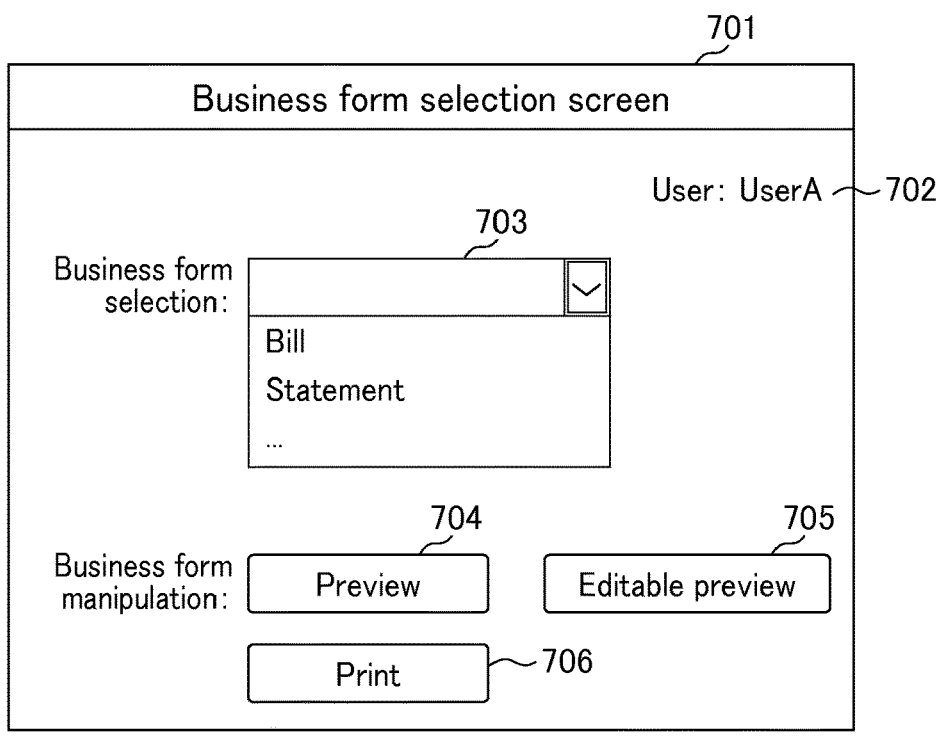
FIG. 7 is a diagram illustrating an example of a business form selection screen.

FIG. 7 is a diagram illustrating an example of the business form selection screen.

In a region 702, the user name of the user who is currently logged in is displayed. A drop-down list 703 displays a list of business forms that the user who is currently logged in owns. The content displayed on the drop-down list 703 is titles of business forms extracted by the page generation unit 302 from the database 305 of business form data via the data access unit 303 and owned by the logged in user. Buttons 704, 705, and 706 are buttons for executing preview, editable preview, and print manipulations and performing business form manipulations with respect to a business form corresponding to a business form title selected from the drop-down list 703. Although description of a process performed after the editable preview button 705 is pressed will be provided below, description of a process performed after the preview button 704 and the print button 706 are pressed will be omitted.

Description will return to FIG. 5. In S504, the access control unit 301 of the business form generation server 101 sends the business form selection screen 701 generated in S503 to the client device 102 via the network 100.

In S505, the client device 102 receives the response from the business form generation server 101 and displays the business form selection screen 701 on the web browser.

In S506, the user selects the title of the business form that he or she wants to manipulate from the drop-down list 703 on the business form selection screen 701.

In S507, when the user presses the editable preview button 705 on the business form selection screen 701, the client device 102 transmits a request for generation of an editable business form browsing screen to the business form generation server 101. The request for generation of an editable business form browsing screen includes information with which a business form to be browsed can be specified.

In S508, the business form generation unit 304 of the business form generation server 101 acquires the form information file 401 and the field data file 406 related to the business form to be browsed via the data access unit 303.

In S509, the business form generation unit 304 of the business form generation server 101 performs an overlay output process using the form information file 401 and the field data file 406 acquired in S508.

Figure 8:
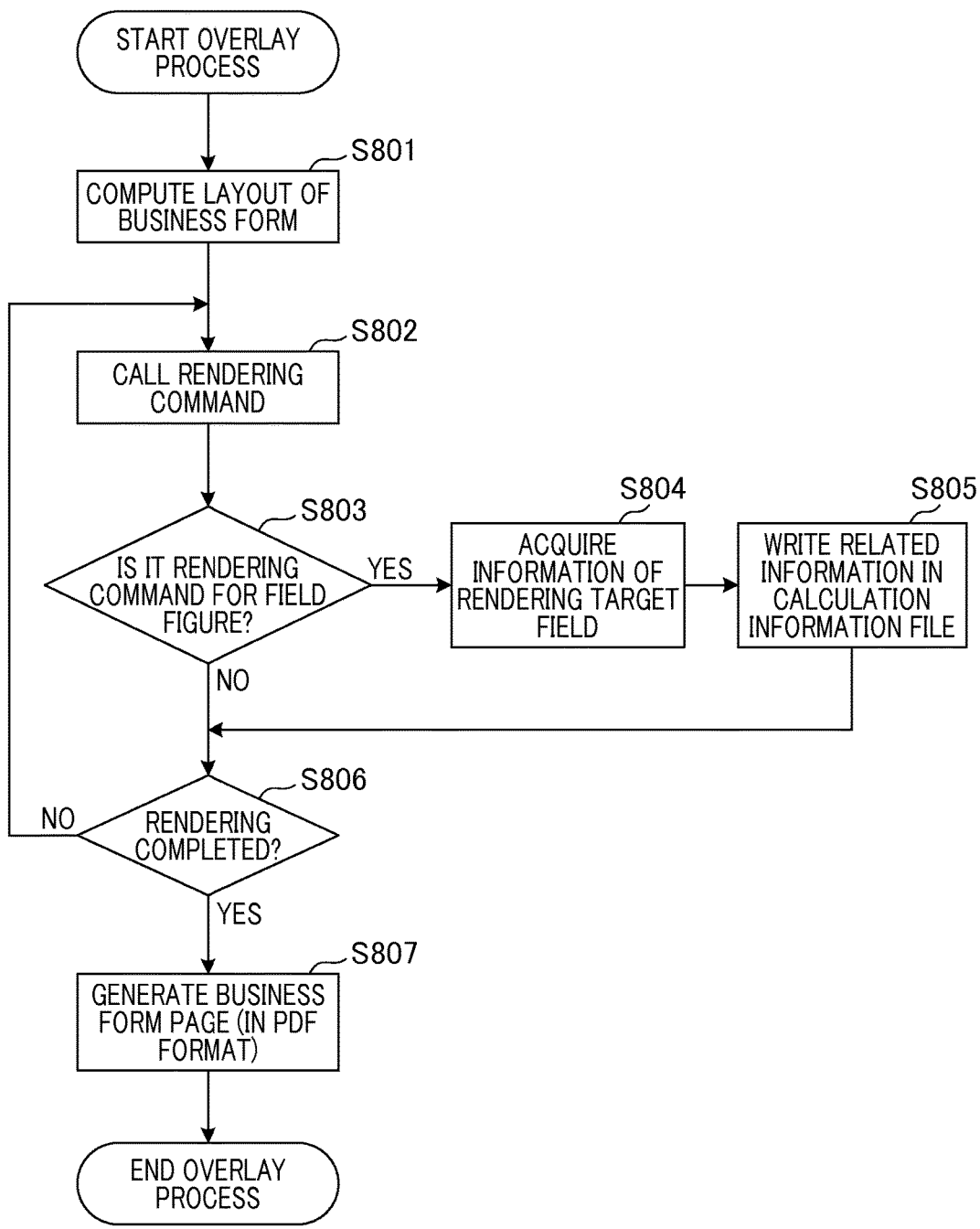
FIG. 8 is a flow chart describing the overlay output process.

The overlay output process will be described below in detail. FIG. 8 is a flow chart describing the overlay output process executed by the business form generation server 101 according to the embodiment of the present invention.

In S801, a layout structure of the business form to be browsed is computed using the form information file 401 and the field data file 406 acquired in S508.

In S802, rendering commands with respect to respective figures (form figures that are not dependent on field data and field figures that are dependent on field data) are sequentially executed according to the layout structure obtained in S801.

In S803, the business form generation unit 304 determines whether or not the rendering command executed in S802 is a rendering command with respect to a field figure. When the rendering command executed in S802 is determined to be a rendering command with respect to a field figure in S803, the business form generation unit 304 proceeds to the process of S804. When the rendering command executed in S802 is determined not to be a rendering command with respect to a field figure in S803, the business form generation unit 304 proceeds to the process of S806.

Figure 9:
FIG. 9 is a diagram showing an example of a configuration of a calculation information file.

In S804, the business form generation unit 304 acquires information of the target field figure of the rendering command executed in S802. The information to be acquired is information regarding the field name of the target field figure, the type of the field figure (record field, total field, or the like), data of record to render, a rendering position of data, and a related field (related information of data within a business form page). In S805, the business form generation unit 304 performs a process of writing the information acquired in S804 in a calculation information file 901 as illustrated in FIG. 9 (calculation information generation). When there is no calculation information file 901, a new calculation information file is created. In addition, when a plurality of pieces of information corresponding to the same field name are to be written, a process of merging different portions (rows 905 and 906) is performed, as in the record "data" on a row 904. Next, the business form generation unit 304 stores the generated calculation information file in the calculation information file database 309 via the data access unit 303. Then, information with which the generated calculation information file can be specified is added to the business form record in the business form data database 305. A configuration of the calculation information file 901 will be described below.

FIG. 9 is a diagram showing an example of the configuration of the calculation information file. In the present embodiment, the calculation information file is in the JSON format. Hereinbelow, the description content of each row of the calculation information file will be referred to as "record."

The record of a row 902 indicates the field name of the field figure. The record of a row 903 indicates the type of the field figure. The record of the row 904 indicates rendering information of data of the field figure. The records of the rows 905 and 906 indicate the value and rendering position (coordinate) of data of the field figure. The record of a row 907 indicates information of a field figure related to the target field figure. When there is no field figure related to a certain field figure, it will be described as "null" as shown in the row 907. In addition, when there is a field figure related to a certain field figure, the field name of the related field figure is described as shown in the records of the rows 908 and 910. Further, a calculation relation of the field figures is also described as shown in the records of the rows 909 and 911.

In S806, the business form generation unit 304 determines whether or not all of the rendering commands have been completed. When the business form generation unit 304 determines that all of the rendering commands have not been completed in S806, it returns to S802, and the next rendering command is executed. When the business form generation unit 304 determines that all of the rendering commands have been completed in S806, it performs the process of S807. In S807, using PDL information (a page description language for instructing a printer to perform rendering) that is the result of the rendering process, the business form generation unit 304 generates a business form page by converting the PDL information into a PDF format through a virtual printer driver.

Description will return to FIG. 5. The business form generation unit 304 converts the business form page in the PDF format generated in S807 into a business form page in a scalable vector graphics (SVG) format in S510. Since it is not possible to edit the business form page in the PDF format directly on a web browser, it is converted into an editable format (the SVG format in the present embodiment). Next, the business form generation unit 304 stores the generated business form page in the SVG format in the business form page file database 308 via the data access unit 303. Then, information with which the generated business form page in the SVG format can be specified is added to the record in the business form data database 305.

In S511, the business form generation server 101 sends the URL of the editable business form browsing screen of the target business form requested in S507 to the client device 102. The sent URL includes the information with which the business form page in the SVG format generated in S510 can be specified. In the present embodiment, the business form name of business form data related to the business form page is included in the sent URL.

In S512, the client device 102 transmits a request for redirecting to the editable business form browsing screen using the URL sent in S511 to the business form generation server 101.

In S513, the page generation unit 302 of the business form generation serer 101 generates the editable business form browsing screen according to the content of the redirecting request of S512. The editable business form browsing screen is generated based on the business form page file of the business form that has been requested, a JAVA SCRIPT® program for controlling browsing, editing, and printing manipulations of the business form page file (control program), and the calculation information file that is necessary during an editing manipulation. That is to say, a program for causing the business form browsing screen to be displayed includes the business form page file, the JAVA SCRIPT® program, and the calculation information file. The page generation unit 302 acquires the business form page file and the calculation information file related to the business form that has been requested from the databases 308 and 309 via the data access unit 303 using the information of the business form name included in the redirecting request of S512.

In S514, the business form generation server 101 sends (transmits) data (a program) for causing the editable business form browsing screen generated in S513 to be displayed to the client device 102.

Figure 10:
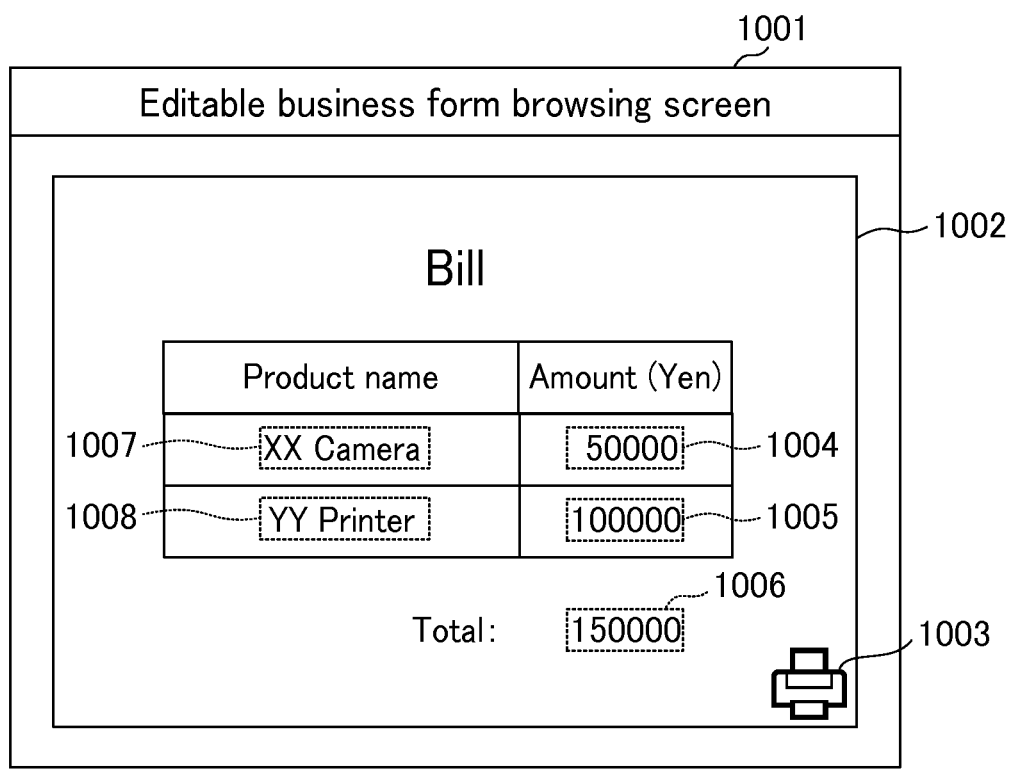
FIG. 10 is a diagram illustrating an example of an editable business form browsing screen.

In S515, the client device 102 takes (receives) the response from the business form generation server 101, and displays the editable business form browsing screen illustrated in FIG. 10 on the web browser. The sequence of the process of generating the editable business form browsing screen has been described above referring to FIG. 5.

FIG. 10 is a diagram illustrating an example of the editable business form browsing screen according to the present embodiment.

The editable business form browsing screen 1001 includes a region 1002 in which a business form page in the SVG format is displayed. When a flicking operation is performed in the region 1002 in the lateral direction, the business form page can be turned to the previous and next pages. A button 1003 is a button for printing the currently displayed business form page. Regions 1004 and 1005 are for results obtained by rendering the record of a record field "amount." The values rendered in the regions 1004 and 1005 and coordinate information indicating the rendering position of each region are described in rows 912 and 913 of the calculation information file 901, respectively. Likewise, a region 1006 is a result obtained by rendering the record of a total field "total." The value and coordinate information rendered in the region 1006 are described in a row 914 of the calculation information file 901. In addition, when the user performs a clicking operation in the region 1002, an editing program (control program) of the editable business form browsing screen operates, and then an editing process as shown in FIG. 11 can be performed.

Figure 11:
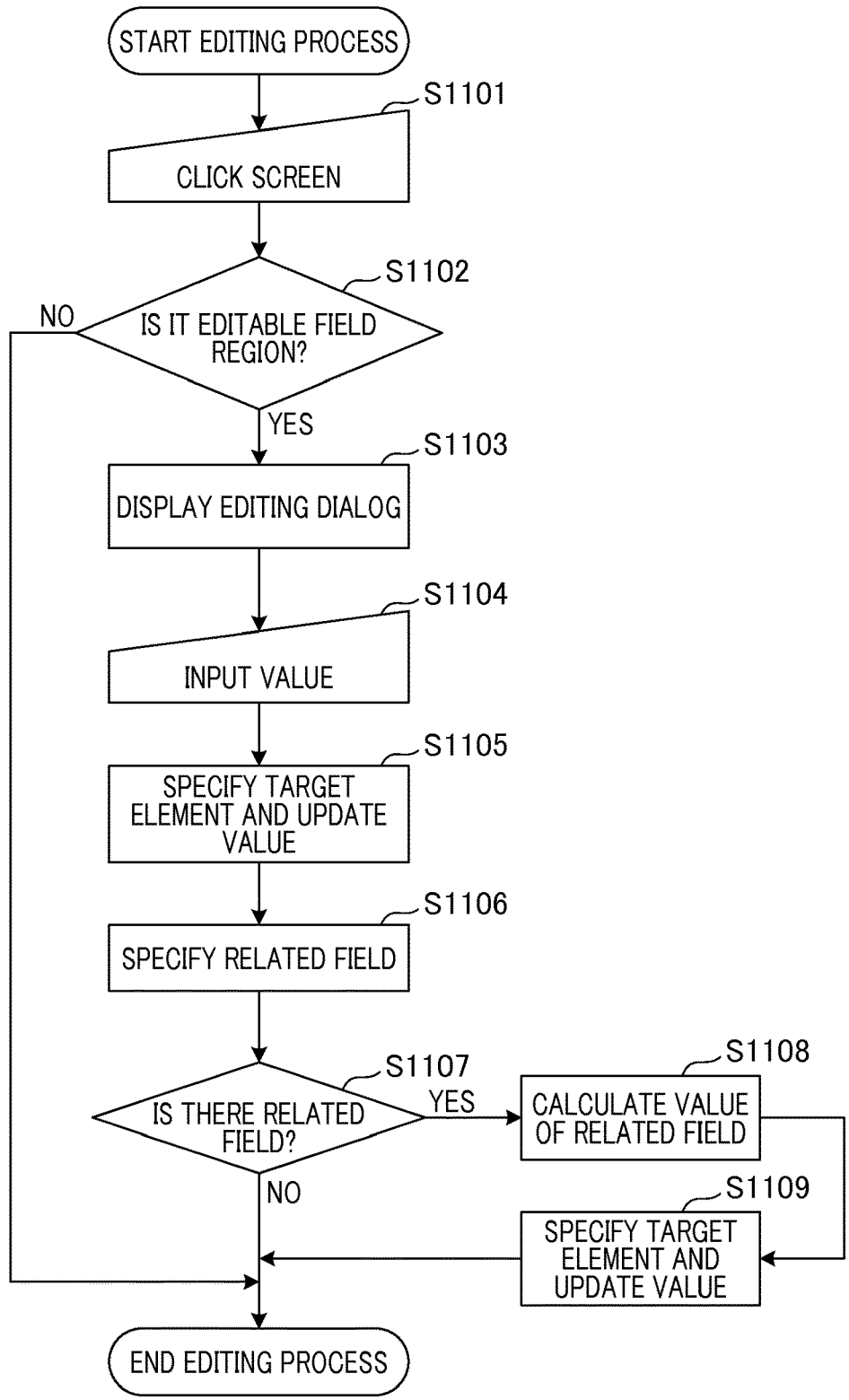
FIG. 11 is a flow chart describing an editing process of the editable business form browsing screen.

FIG. 11 is a flow chart describing the editing process performed on the editable business form browsing screen according to the present embodiment.

In S1101, the user performs a clicking operation in the region 1002 of the editable business form browsing screen 1001. In S1102, the editing program (control program) of the editable business form browsing screen determines whether or not the position at which clicking has been performed in S1101 is within the region of an editable field. Hereinafter, the editing program of the editable business form browsing screen will be abbreviated as an editing program. Specifically, whether or not the coordinates of the position at which the user has clicked are included in the regions of the data of the calculation information file 901 (described as attributes of "position" on the rows 905, 906, 912, 913, and 914). In addition, although it is not essential, when the total field (for example, the total field "total") is set to be uneditable, the region of data of the total field (for example, the region indicated by the row 914) is excluded from the target regions. In the present embodiment, the total field is set to be uneditable.

In S1102, when the position at which the user has clicked is determined to be within the region of the editable field, the editing program causes an editing dialog 1201 (editing screen) to be displayed (S1103). On the other hand, when the position at which the user has clicked is determined not to be within the region of the editable field in S1102, the editing program ends the editing process without performing anything. In the present embodiment, when any of the regions 1004, 1005, 1007, and 1008 is clicked by the user on the editable business form browsing screen 1001, the position at which the user has clicked is determined to be within the region of the editable field. For example, when the user clicks the region 1004, the clicked position corresponds to the first record (row 912) of the field "amount" 917 in the calculation information file 901. In addition, field information and data information corresponding to the clicked position in the calculation information file are stored for future processes.

In S1104, the user inputs a new value into a text box 1202 of the editing dialog 1201 and clicks a "confirm" button 1203.

Figure 12A:
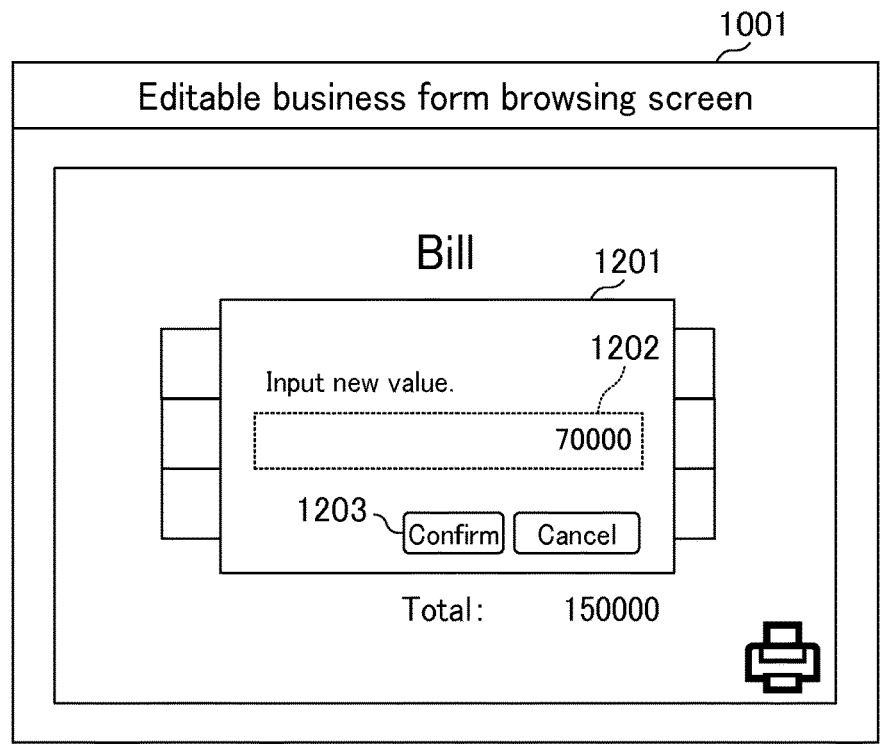
FIGS. 12A and 12B are diagrams illustrating states in which editing manipulations have been performed on the editable business form browsing screen.
Figure 12B:
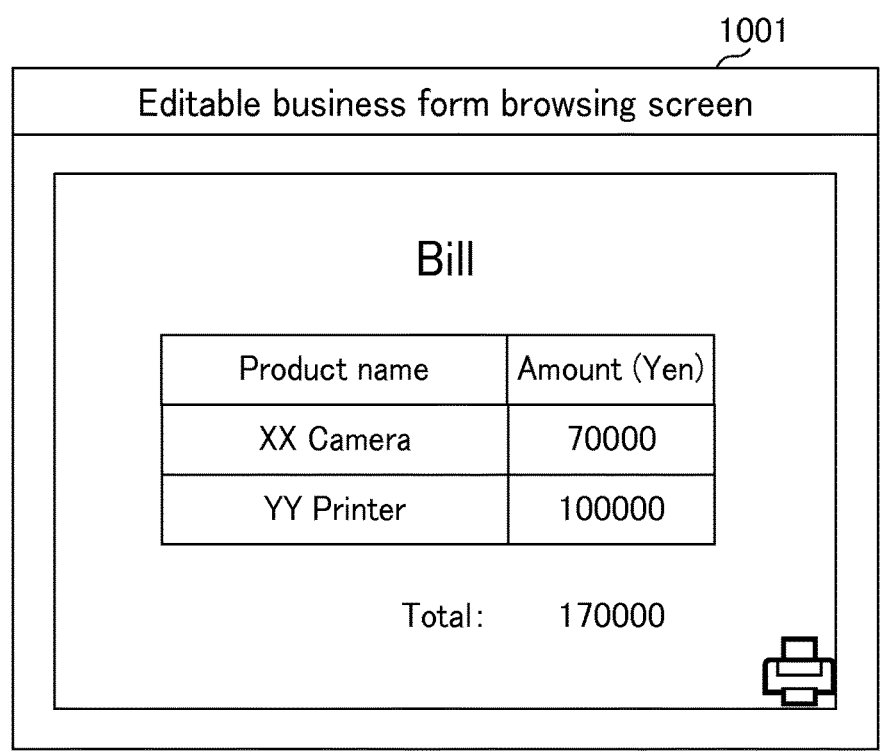

In S1105, the editing program specifies a text element (tag <text>) corresponding to the clicked position of S1101 from the SVG file displayed in the region 1002. Then, the value in the specified text element is replaced with the value that the user has input in S1104. In addition, the value of data corresponding to that of the calculation information file 901 is replaced with the value input by the user. The example illustrated in FIGS. 12A and 12B show a case in which the value "50000" of the region 1004 of FIG. 10 is replaced with "70000."

In S1106, the editing program specifies a field that is related to the field corresponding to the clicked position stored in S1102. For example, when the user clicks the region 1004, the clicked position corresponds to the row 912 indicating the record of the field "amount" 917 in the calculation information file 901. Then, the fact that the field "amount" 917 is related to the field "total" can be specified from the row 908.

When a related field of S1106 has been specified, the process proceeds to the process of S1108 in S1107. When a related field has not been specified, the editing process ends.

In S1108, the value of data of the related field specified in S1106 is calculated. Specifically, the value of data of the related field is calculated using information of the record "relative field" of the field described in the calculation information file 901. For example, the field "total" 916 is related to the field "amount" 917 as described in the "relative field" 910. Then, the value of the data of the field "total" 916 becomes the total value ("sum") of the values of the data of the field "amount" 917 according to a function "function" 911 which indicates the processing content (a calculation relation between the fields).

In S1109, the editing program specifies a text element corresponding to the data of the related field from the SVG file displayed in the region 1002 and updates the value as in S1105. FIG. 12A shows the state of the editable business form browsing screen 1001 when the user clicks the region 1004 and inputs "70000" into the displayed editing dialog 1201. In addition, FIG. 12B shows the state of the editable business form browsing screen 1001 after the "confirm" button 1203 is pressed to update the value switched from the state of FIG. 12A. The value of the data of the field "total" 916 is calculated based on the edited value "70000" and the value of the region 1006 is updated to the calculated total value "170000."

Figure 13:
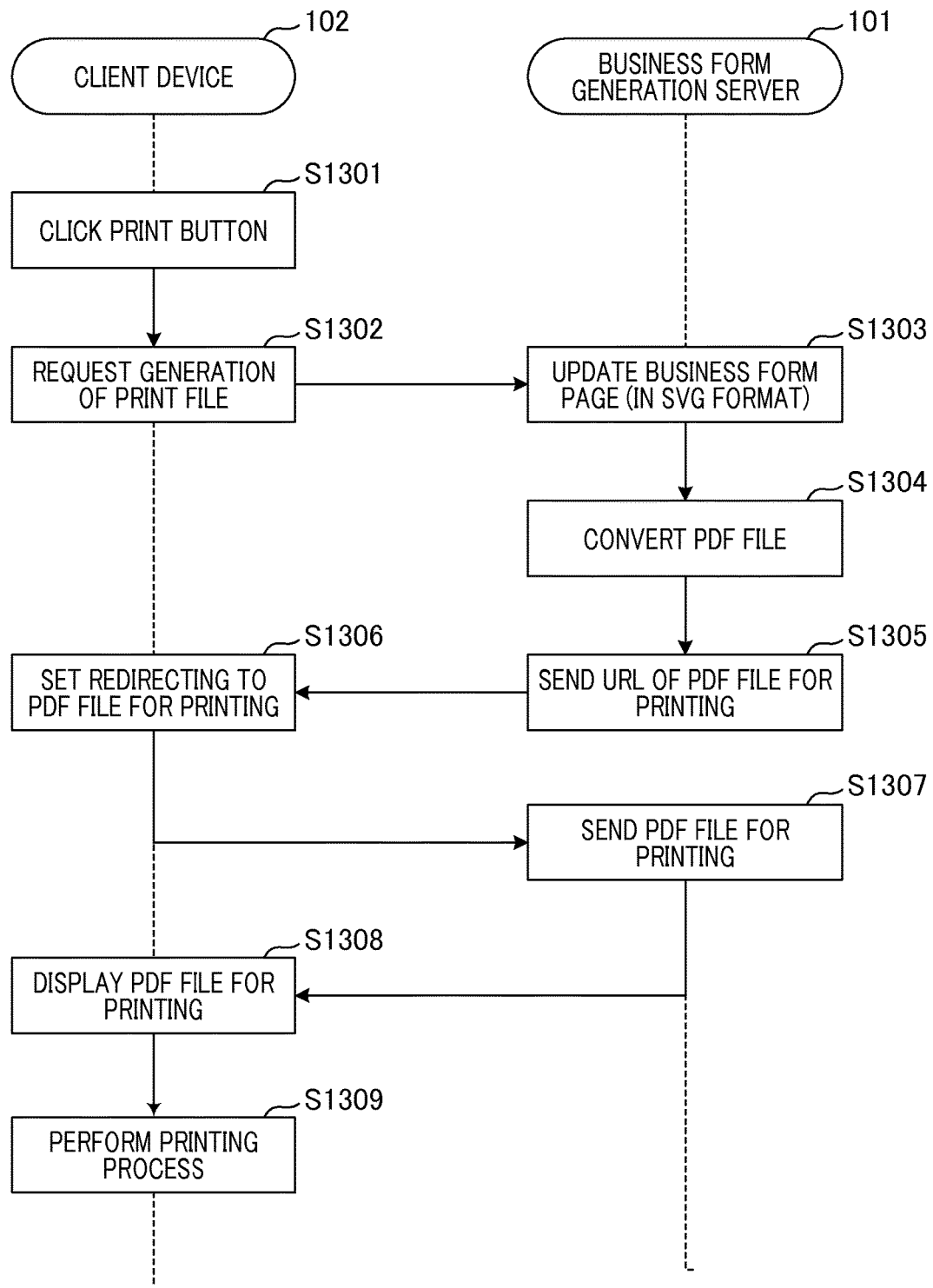
FIG. 13 is a diagram showing the sequence of a printing process when a print button is pressed.

FIG. 13 is a diagram showing the sequence of a printing process when a print button of the editable business form browsing screen is pressed.

In S1301, the print button 1003 of the editable business form browsing screen 1001 is pressed by the user. In S1302, the client device 102 transmits a request for generating a print file to the business form generation server 101. The request for generating a print file includes the business form page file in the SVG format currently retained by the client device 102.

In S1305, the business form printing unit 310 sends the URL for access to the PDF file generated in S1304 to the client device. In S1306, the client device 102 sets redirecting to the URL for access to the PDF file sent in S1305. In S1307, the access control unit 301 of the business form generation server 101 sends the PDF file generated in S1304 to the client device via the data access unit 303. In S1308, the client device 102 receives the PDF file sent in S1307, and displays the PDF file using software (ADOBE® PDF reader, or the like) which can display PDF files on a web browser. In S1309, the client device 102 prints the PDF file using software that can print PDF files.

In S1305, the business form printing unit 310 sends the URL for access to the PDF file generated in S1304 to the client device. In S1306, the client device 102 sets redirecting to the URL for access to the PDF file sent in S1305.

In S1307, the access control unit 301 of the business form generation server 101 sends the PDF file generated in S1304 to the client device via the data access unit 303. In S1308, the client device 102 receives the PDF file sent in S1307, and displays the PDF file using software (Adobe (registered trademark) PDF reader, or the like) which can display PDF files on a web browser.

In S1309, the client device 102 prints the PDF file using software that can print PDF files.

As described above, according to the present embodiment, when there is data in overlay-output business form document data related thereto in terms of calculation, related information indicating a relation in terms of calculation is output along with the business form document data. Accordingly, an information processing system in which, when business form document data is edited on a browsing screen, data related to the foregoing data is also automatically updated in real time can be provided.

Second Embodiment

Next, an information processing system in which business form document data can be browsed and edited according to a second embodiment of the present invention will be described. In the first embodiment, the editing manipulation of the editable business form browsing screen has been described with respect to the case in which the layout of the business form page is not changed. A layout of the business form page refers to disposition after an overlay output process of each figure defined in each form file.

Figure 14A:
FIGS. 14A and 14B are diagrams for describing a change in the layout of an editable business form browsing screen.
Figure 14B:

For example, a business form page of FIG. 14A has a field "tax" to indicate whether or not a tax is included in the price of each product. In addition, there is a field "subtotal" to separately calculate the total value of "tax included" products and the total value of "tax excluded" products. In this example, when a user changes the value of a region 1402 from "tax included" to "tax excluded," the display of the region is desirably changed according to the calculation rule of the subtotal as illustrated in FIG. 14B.

In this case, whether or not an editing manipulation performed on the business form browsing screen affects the layout is determined, and with respect only to an editing manipulation which affects the layout, a request for generating an editable business form browsing screen is transmitted to the business form generation server 101 in the present embodiment.

According to the present embodiment, it is possible to browse and automatically edit business form document data ensuring a real time manner even for data having a relation in terms of calculation in business form document data during editing of a field which affects the layout of a business form page. Details of the editing process according to the present embodiment will be described below with reference to FIG. 16.

Figure 15:
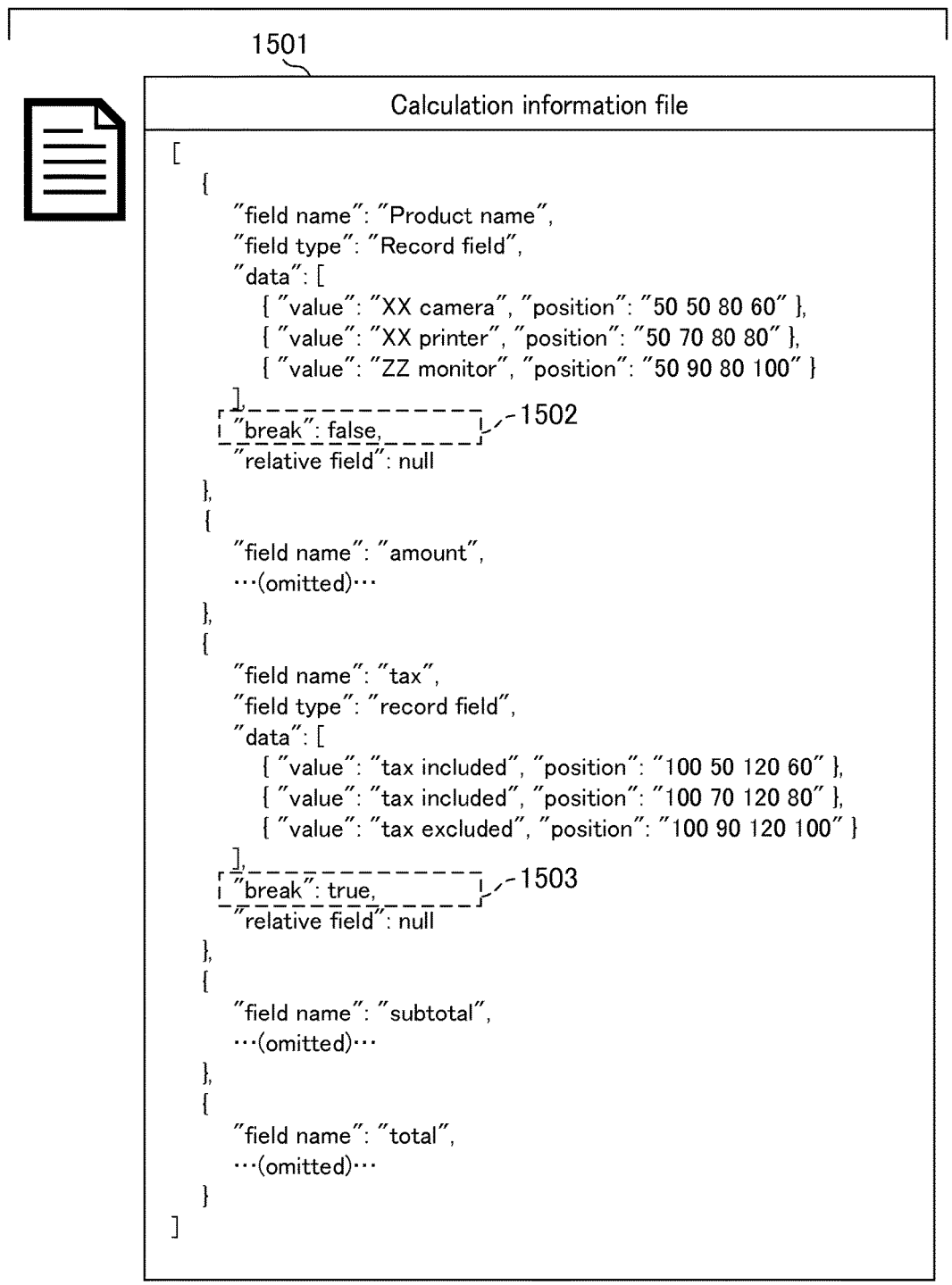
FIG. 15 is a diagram showing an example of a configuration of a calculation information file.

FIG. 15 is a diagram showing an example of a configuration of a calculation information file according to the present embodiment. Description will be omitted with respect to the same configuration as that of the calculation information file of the first embodiment shown in FIG. 9.

In the calculation information file in the example illustrated in FIGS. 14A and 14B, "break" is set for the record field "tax." Break refers to performing an associated process when the value of data of a record field is changed. In the case illustrated in FIGS. 14A and 14B, break occurs when the data of the record field "tax" is changed from "tax included" to "tax excluded," and a total (subtotal) of the "tax included" is calculated.

In S805 of FIG. 8, the business form generation server 101 stores the records of the record "break" in rows 1502 and 1503 which indicate whether or not "break" has been set in each editable field in the calculation information file when the calculation information file is created. The business form creation unit 304 of the business form generation server 101 acquires information for creating the record "break" from a form information file in S804.

Figure 16:
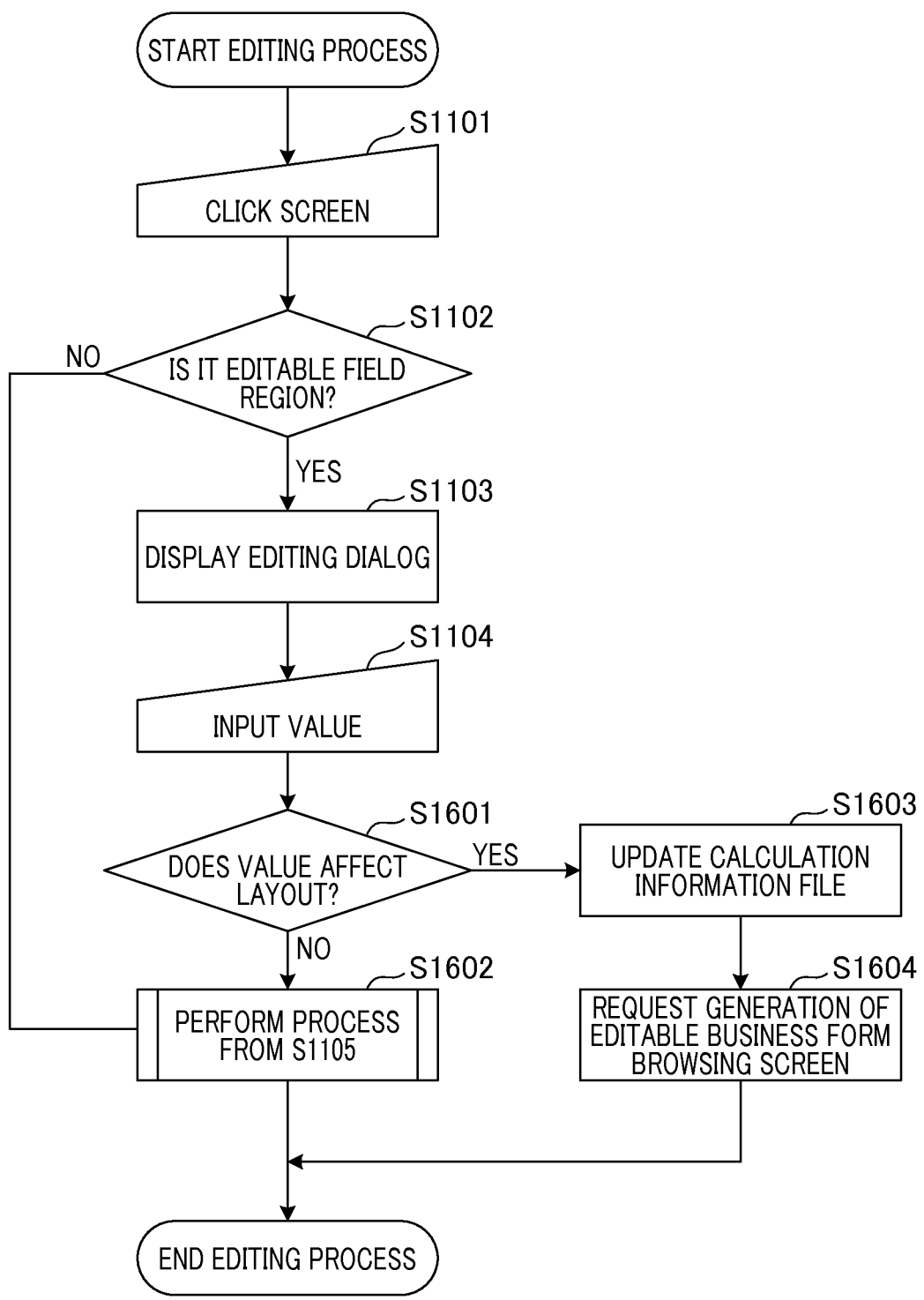
FIG. 16 is a flow chart describing an editing process of an editable business form browsing screen.

FIG. 16 is a flow chart describing an editing process according to the present embodiment. Description of the same processes will be omitted by giving the same reference numerals as those of the editing process of the first embodiment shown in FIG. 11 thereto.

In S1601, the editing program determines whether or not the value that the user has input into the text box 1202 of the editing dialog 1201 affects the layout of the business form page. In the present embodiment, whether or not the layout is affected is determined based on whether or not the record "break" of the corresponding field of a calculation information file 1501 is set to "true." In the example illustrated in FIGS. 14A and 14B, when the value of the region 1402 is changed from "tax included" to "tax excluded," the record "break" 1503 of the corresponding field in the region 1402 is acquired, and since the value of the field is "true," the process of S1601 is determined to be true. A criterion for determining S1601 is not limited to the above case because the setting of "break" is not the only factor that affects the layout of the business form page.

When the value that the user has input into the editing dialog 1201 is determined not to have affected the layout of the business form page in S1601, the process proceeds to S1602, and the processes from S1105 of FIG. 11 are performed. When the value that the user has input into the editing dialog 1201 is determined to have affected the layout of the business form page in S1601, the process of S1603 is performed.

In S1603, the editing program updates the calculation information file 1501 retained by the client device 102 according to the input value. In S1604, the editing program transmits a request for generating an editable business form browsing screen to the business form generation server 101. The request includes the calculation information file updated in S1603. Although later processes are not illustrated, the business form generation server 101 receives the request of S1604, and compares the calculation information file included in the request to calculation information files stored in the calculation information file database 309. Then, using the result of the comparison, field data of the business form stored in the field data file database 307 is updated. Successively, the business form generation server 101 performs the processes from S508 of FIG. 5.

The same effect as that of the first embodiment is exhibited according to the present embodiment as described above. Further, according to the present embodiment, it is possible to provide an information processing system in which business form document data can be browsed and automatically edited in real time even when there is a change in the layout of a business form page.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-172724, filed Aug. 27, 2014, which is hereby incorporated by reference wherein in its entirety.

What is claimed is:

1. A method for controlling an information processing apparatus, the method comprising:
generating PDL (Page Description Language) information by executed rendering commands for overlaying form information and field data;
automatically generating, by acquiring information of a plurality of fields included in the rendering commands when executing the rendering commands in the generated PDL information, calculation relationship information which indicates a calculation relation between the plurality of fields, wherein the generated PDL information does not include the generated calculation relationship information;
generating a form page in a PDF (Portable Document Format) format by converting the generated PDL information with a virtual printer driver;
converting the form page in the PDF format into the form page in an SVG (Scalable Vector Graphics) format;
generating, based on the converted form page in the SVG format and the generated calculation relationship information, a web application that displays a browsing screen on which both of browsing and editing of the form page in the SVG format are performed; and
transmitting the generated web application to a client device, wherein the client device executes the transmitted web application on a web browser of the client device to display the browsing screen on which both of browsing and editing of the form page in the SVG format is performed according to the calculation relationship information.

2. A non-transitory storage medium for storing a computer program that causes a computer to execute:
generating PDL (Page Description Language) information by executed rendering commands for overlaying form information and field data;
automatically generating, by acquiring information of a plurality of fields included in the rendering commands when executing the rendering commands in the generated PDL information, calculation relationship information which indicates a calculation relation between the plurality of fields, wherein the generated PDL information does not include the generated calculation relationship information;
generating a form page in a PDF (Portable Document Format) format by converting the generated PDL information with a virtual printer driver;
converting the form page in the PDF format into the form page in an SVG (Scalable Vector Graphics) format;
generating, based on the converted form page in the SVG format and the generated calculation relationship information, a web application that displays a browsing screen on which both of browsing and editing of the form page in the SVG format are performed; and
transmitting the generated web application to a client device, wherein the client device executes the transmitted web application on a web browser of the client device to display the browsing screen on which both of browsing and editing of the form page in the SVG format is performed according to the calculation relationship information.

3. An information processing apparatus comprising:
a memory for storing a computer program; and
a processor for executing the computer program to perform:
generating PDL (Page Description Language) information by executing rendering commands for overlaying form information and field data;
automatically generating, by acquiring information of a plurality of fields included in the rendering commands when executing the rendering commands in the generating of the PDL information, calculation relationship information which indicates a calculation relation between the plurality of fields, wherein the generated PDL information does not include the generated calculation relationship information;
generating a form page in a PDF (Portable Document Format) format by converting the generated PDL information with a virtual printer driver;
converting the form page in the PDF format into the form page in an SVG (Scalable Vector Graphics) format;
generating, based on the converted form page in the SVG format and the generated calculation relationship information, a web application that displays a browsing screen on which both of browsing and editing of the form page in the SVG format are performed; and
transmitting the generated web application to a client device, wherein the client device executes the transmitted web application on a web browser of the client device to display the browsing screen on which both of browsing and editing of the form page in the SVG format is performed according to the calculation relationship information.

4. The information processing apparatus according to claim 3, wherein the client device executes:
receiving the transmitted web application;
executing the web application on the web browser of the client device to display the browsing screen for performing both of browsing and editing of the form page in the SVG format according to the calculation relationship information;
calculating, if the form page browsed by executing the web application is edited, data which has a calculation relation with edited data based on the calculation relationship information; and updating the browsing screen based on the edited data and the calculated data.

5. The information processing apparatus according to claim 3, wherein the generated web application includes the form page in the SVG format, the calculation relationship information, and a control program for controlling the browsing and the editing of the form page.

6. The information processing apparatus according to claim 4, wherein the client device determines whether or not a region of the browsing screen in which an editing manipulation has been performed is an editable region displayed by the web application, and if the region is determined to be the editable region, an editing screen for performing the editing is displayed by the web application, and wherein, if data has been edited on the displayed editing screen, the client device calculates data which has a calculation relation with the edited data based on the calculation relationship information, and updates the browsing screen based on the edited data and the calculated data.

7. The information processing apparatus according to claim 6, wherein the calculation relationship information has information which indicates whether or not there is a field related to each field of data on the browsed form page, and wherein, if the data has been edited on the editing screen, the client device specifies the field related to the edited data from the calculation relationship information.

8. The information processing apparatus according to claim 6, wherein the calculation relationship information has information which indicates whether or not there is a field related to each field of data on the browsed form page and processing content with respect to the related field, and wherein, if the data has been edited on the editing screen, the client device specifies the field related to the edited data from the calculation relationship information and updates the specified field using a processing content.

9. The information processing apparatus according to claim 4, wherein, if the updated browsing screen is to be printed, the client device transmits edited data of the updated browsing screen to the information processing apparatus, and wherein the information processing apparatus updates the form page based on the transmitted edited data to create data for printing.

10. The information processing apparatus according to claim 9, wherein the client device determines whether the edited data affects layout of the browsed form page, and wherein, if the edited data affects the layout of the browsed form page, the client device transmits the edited data to the information processing apparatus, the information processing apparatus newly creates form page based on the transmitted edited data, the information processing apparatus transmits a browsing screen of the newly created form page to the client device, and the client device displays the browsing screen.

\* \* \* \* \*